United States Patent [19]
Bofill

[11] Patent Number: 5,318,311
[45] Date of Patent: Jun. 7, 1994

[54] COMBINATION CHILD VEHICLE SEAT AND STROLLER

[76] Inventor: Julio A. Bofill, 140-35 Beech Ave., Apt. LD, Flushing, N.Y. 11355

[21] Appl. No.: 976,730

[22] Filed: Nov. 16, 1992

Related U.S. Application Data

[63] Continuation of Ser. No. 689,011, Apr. 22, 1991, abandoned.

[51] Int. Cl.⁵ .............................................. B62B 7/12
[52] U.S. Cl. ................................. 280/30; 280/648; 280/39
[58] Field of Search ................ 200/30, 37, 39, 43.13, 200/43.14, 43.24, 47.4, 643, 648, 650, 654, 655

[56] References Cited

U.S. PATENT DOCUMENTS

| | | | |
|---|---|---|---|
| 2,456,932 | 12/1948 | Dostal | 280/37 |
| 2,509,103 | 5/1950 | Lewis et al. | 280/39 |
| 3,960,252 | 6/1976 | Cassimally | 280/37 |
| 4,087,102 | 5/1978 | Sprague | 280/37 |
| 4,314,624 | 2/1982 | Royet | 280/37 X |
| 4,632,409 | 12/1986 | Hall | 280/643 |
| 4,659,096 | 4/1987 | Leimgruber | 280/39 |
| 4,679,804 | 7/1987 | Johnson | 280/30 |
| 4,736,959 | 4/1988 | Van Steenburg | 280/643 X |
| 4,768,795 | 9/1988 | Mar | 280/643 X |
| 4,822,064 | 4/1989 | Hunter | 280/30 |
| 4,828,281 | 5/1989 | Sanchas | 280/30 |
| 4,832,354 | 5/1989 | LaFreniere | 280/30 |
| 4,845,804 | 7/1989 | Garrett | 280/37 |
| 4,872,692 | 10/1989 | Steenburg | 280/30 |
| 4,878,680 | 11/1989 | Molnar | 280/30 |
| 4,896,894 | 1/1990 | Singletary | 280/30 |
| 4,946,180 | 8/1990 | Baer | 280/39 |
| 4,989,888 | 2/1991 | Qureshi | 280/643 |
| 5,104,134 | 4/1992 | Cone | 280/30 |
| 5,149,113 | 9/1992 | Alldredge | 280/30 |

FOREIGN PATENT DOCUMENTS 979608  4/1951  France ............................. 280/39

*Primary Examiner*—Brian L. Johnson
*Attorney, Agent, or Firm*—Rohm & Monsanto

[57] ABSTRACT

A combination vehicle seat and stroller for a child is provided with retractable wheel assemblies which forms a substantially flush, smooth bottom surface which will minimize damage to the upholstery of the vehicle. The apparatus is provided with a handle which is retractable when the apparatus is used in a vehicle seat mode, and deployable for use as a stroller. A coupling system is optionally provided for deploying and retracting the wheel assemblies in response to the deployment and retraction of the handle. Forward ones of the wheel assemblies are arranged to pivot so as to provide a steering capability to the stroller, and may be longer than the rear wheel assemblies so as to provide a reclining attitude for the child.

5 Claims, 2 Drawing Sheets

5,318,311

COMBINATION CHILD VEHICLE SEAT AND STROLLER

RELATIONSHIP TO OTHER APPLICATION

This application is a continuation of U.S. Ser. No. 07/689,011, filed Apr. 22, 1991, now abandoned.

BACKGROUND OF THE INVENTION

This invention relates generally to equipment for transporting children, and more particularly, to an apparatus which can serve as a vehicle seat for a child, and alternatively as a stroller.

Major campaigns are being waged by lawmakers, insurance companies, and safety conscious groups toward the end of educating motorists of the need for the use of equipment specially designed for transporting children in motor vehicles. Most jurisdictions now mandate that small children must be provided with a vehicle seat which will restrain the child in the event of a collision. This need to provide a child vehicle seat has required parents to carry in their vehicles two relatively bulky items, to wit: a child vehicle seat for use during operation of the vehicle, and a stroller or carriage for use at the destination.

This problem has been addressed by providing devices which function as both, child vehicle seats and strollers on wheels. However, it is a problem with known combination devices that, while the devices are in the vehicle seat mode, they rest on tubular or other frame members which can damage the upholstery of the vehicle. Additionally, in most tubular-framed car seat/stroller devices the stroller wheels, which have been rolled on the ground during use of the device as a stroller, are permitted to come into contact with the upholstery of the vehicle. Thus, such known devices will soil the vehicle's upholstery, and possibly damage same.

One prior art apparatus which avoids all contact by the stroller wheels with the upholstery of the vehicle utilizes a base unit which accommodates the stroller apparatus. The base unit is arranged on the seat of the vehicle, and the stroller portion of the apparatus is accommodated therein and secured thereto by operation of a latching mechanism. This known approach suffers from the disadvantage that a portion of the overall apparatus, i.e., the base unit, remains in the vehicle at all times resulting in inconvenience when the apparatus is transferred from vehicle to vehicle.

It is, therefore, an object of this invention to provide a simple and inexpensive vehicle car seat and stroller combination apparatus which does not damage the upholstery of the vehicle in which it is used.

It is another object of this invention to provide a child's stroller which can be used as a vehicle seat without exposing the vehicle's upholstery to dirt and foreign material which has been collected on the wheels of the stroller.

It is additionally an object of this invention to provide a child's stroller which can be used as a vehicle seat without exposing the vehicle's upholstery to damage from levers, shafts, pins, and mechanisms associated with the wheels of the stroller.

It is also an object of this invention to provide an apparatus can easily be converted between stroller and car seat modes of operation.

It is a further object of this invention to provide an apparatus which is convertible between a car seat and a stroller, and which provides smooth back and bottom surfaces so that it can easily be carried by an individual and supported on the lap of the individual.

SUMMARY OF THE INVENTION

The foregoing and other objects are achieved by this invention which provides an apparatus which can be operated in a vehicle-seat mode and in a stroller mode. The apparatus of the present invention is provided with a shell member having a seat portion, a back portion, and a pair of side portions. The side portions are arranged to hold a seat belt of the vehicle in a predetermined spatial relationship with respect to the shell member. Thus, the apparatus can be securely restrained within the vehicle by a seat belt. The apparatus is further provided with a plurality of wheel assemblies, each having a wheel which is rotatably coupled to a first side of a carrier. A plurality of pivot couplers is provided to couple the wheel assemblies to the shell member. Preferably, each such wheel assembly is coupled to the shell in the vicinity where the seat portion joins the side portion. The pivot couplers permit each of the wheel assemblies to be pivotable between a respective first position where the wheels are deployed to achieve the stroller mode of operation, and a second position where a second side of the carrier member is substantially flush with an outer surface of the seat portion of the shell member. Thus, while in the second position, the wheel itself is accommodated substantially within the shell member, whereby it cannot come into contact with the upholstery of the vehicle's seat.

In one highly advantageous embodiment of the invention, a handle is coupled to the back portion of the shell member for facilitating the use of the apparatus in the stroller mode. Preferably, the handle is movable so as to have first and second positions. When the handle is placed in the first position, the apparatus is in the stroller mode, and when the handle is placed in the second position, it can be retracted substantially into the shell member itself, whereby the apparatus assumes the vehicle seat mode of operation.

In a still further embodiment of the invention, the handle can be coupled to the pivot couplers of the wheel assemblies so that the wheels can be deployed in response to the actuation of the handle. In a specific illustrative embodiment of the invention, the handle can be deployed outwardly to achieve the stroller mode, and the coupling arrangement can responsively urge the wheel assemblies into a first position wherein they are enabled to communicate with the ground in the stroller mode. A biasing apparatus, such as a spring, may be employed to urge the wheel assemblies either into the stroller mode or the vehicle seat mode.

In a still further embodiment of the invention, a total of four wheel assemblies are provided, arranged in first and second pairs. The pairs are arranged along respective sides of the apparatus, and can be coupled to one another so as pivot simultaneously between their respective first and second positions.

BRIEF DESCRIPTION OF THE DRAWING

Comprehension of the invention is facilitated by reading the following detailed description, in conjunction with the annexed drawing, in which.

DETAILED DESCRIPTION

Figure 1:
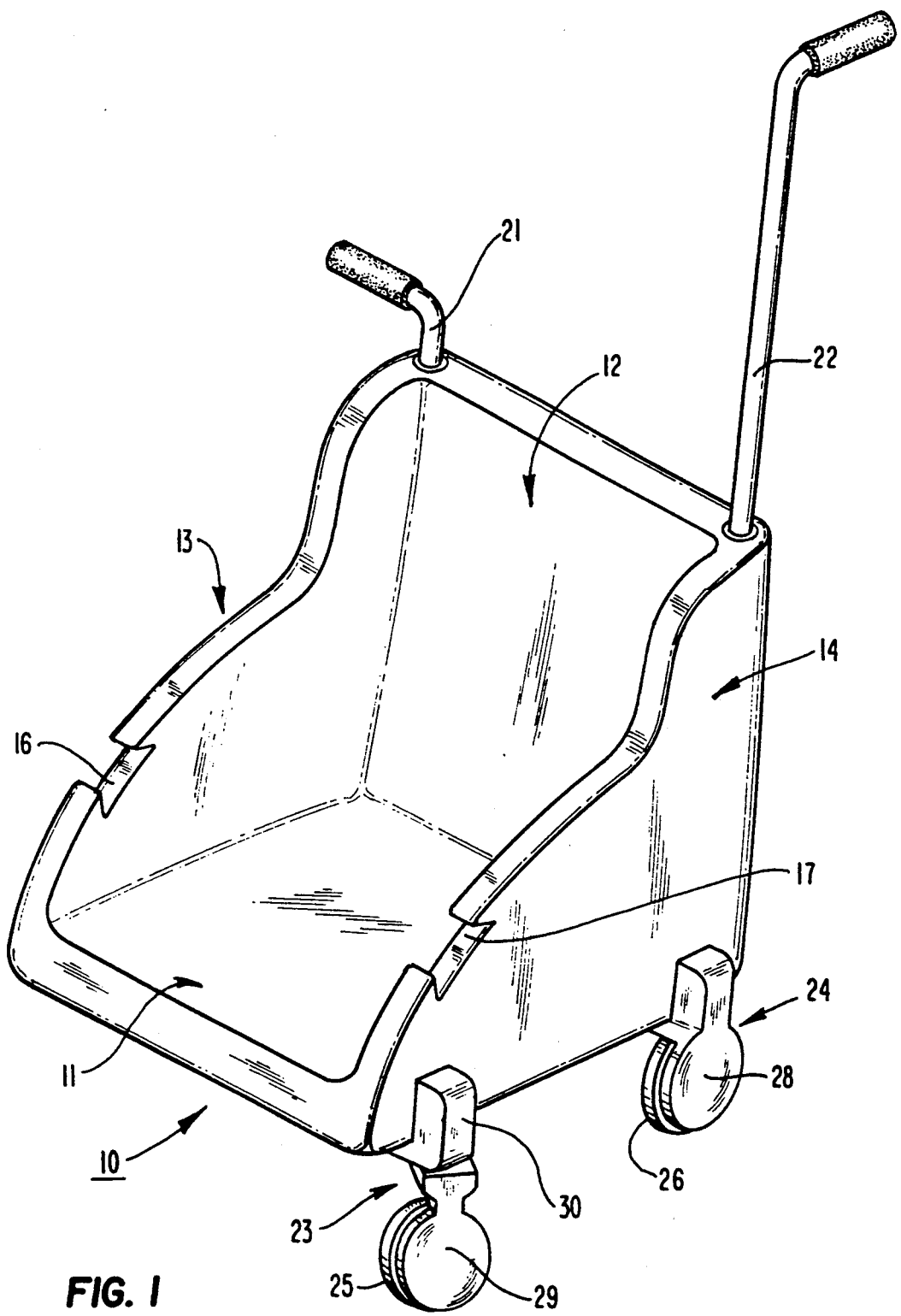
FIG. 1 is an isometric representation of a specific illustrative embodiment of the invention which is partially in a stroller mode and partially in a vehicle seat mode.

FIG. 1 is an isometric representation of a specific illustrative embodiment of the invention. As shown, an apparatus 10 is arranged to have a seat portion 11, a back portion 12, and side portions 13 and 14. Apparatus 10, in this embodiment is configured in part as a shell having hollow portions therewithin which are not visible in this figure. Seat portion 11, back portion 12, side portion 13, and side portion 14 each have an associated inner surface which faces toward the child (not shown) which would be seated in the apparatus, and an associated outward surface.

Side portions 13 and 14 are provided, in this embodiment, with seat belt accommodation regions 16 and 17 on their respective outer edges. The seat belt accommodation regions prevent a seat belt (not shown) of the vehicle (not shown) from becoming dislodged whereby the apparatus would fail to be secured safely to the vehicle's seat.

In this specific embodiment, apparatus 10 is provided with handles 21 and 22 which are accommodated in a hollow region (not shown in this figure) of back portion 12. As shown, handle 21 is in a retracted position, while handle 22, has been deployed to facilitate pushing of the apparatus in a stroller mode. In certain embodiments, the handles are formed of tubes contained within tubes so as to be telescopic.

FIG. 1 further shows two wheel assemblies, 23 and 24, which are deployed to expose respective wheels 25 and 26. Thus, wheel assemblies 23 and 24 are deployed in the stroller mode. A further pair of wheel assemblies (not shown in this figure) is provided in the vicinity of the bottom of side portion 13. In the present embodiment, handle 22 is coupled to wheel assemblies 23 and 24 by operation of a coupling system (not shown in this figure) which will be described hereinbelow in the context of a specific illustrative embodiment. The coupling arrangement (not shown in this figure) functions to deploy the wheel assemblies into the stroller mode when handle 22 is itself deployed in a stroller mode. Since handle 21 is retracted into its car seat mode, its respectively associated pair of wheels assemblies is similarly retracted, as will be described.

Wheel 26 of wheel assembly 24 is arranged on a wheel carrier 28 which, as shown, maintains wheel 26 substantially parallel to side portion 14. Wheel 23, however, has its corresponding wheel carrier 29 arranged to pivot with respect to a pivot support 30. Thus, the pivoting feature of wheel assembly 23 facilitates steering of the apparatus while in the stroller mode.

Figure 2:
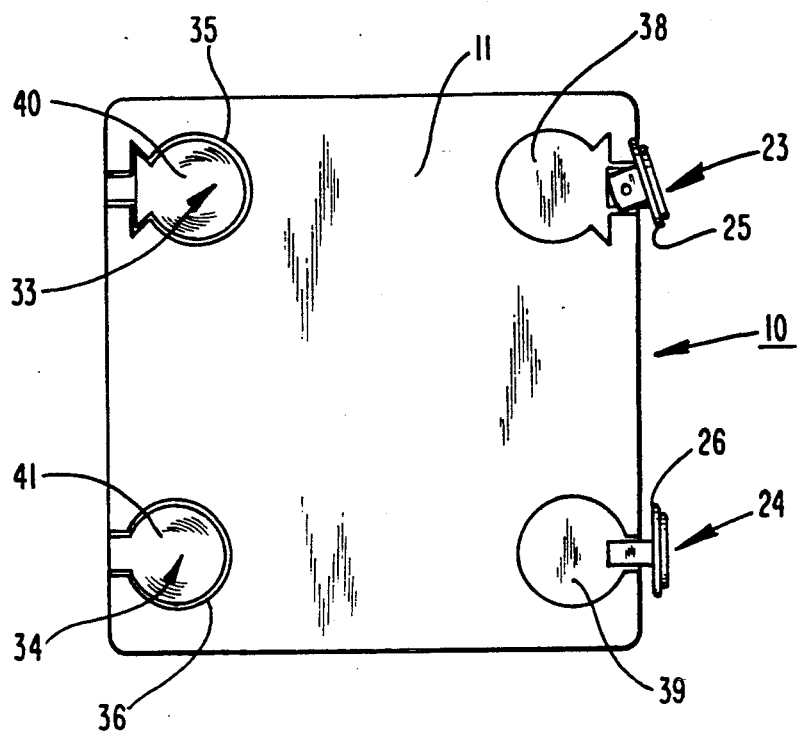
FIG. 2 is a bottom plan view of the embodiment of FIG. 1.

FIG. 2 is a plan view of the underside of apparatus 10. This figure additionally shows a further pair of wheel assemblies 33 and 34 which are, as previously stated, in the retracted, car seat mode. These wheel assemblies are accommodated within openings 35 and 36 in the outer surface of seat portion 11. Similarly, wheel assemblies 23 and 24 are provided with openings 38 and 39 in which these wheels are accommodated when they are retracted into the vehicle mode. Wheel assemblies 33 and 34, like their counterparts 23 and 24, are provided with respective wheel carriers, 40 and 41. When the wheel assemblies are retracted, the wheel carriers form a substantially flush surface with the outer surface of seat portion 11. The resulting smooth surface prevents damage to the upholstery of the vehicle (not shown), prevents the wheels themselves from coming into contact with such upholstery, and enhances the ability of the apparatus to be carried on the lap of an individual when comforting of the child is warranted.

As shown in FIGS. 1 and 2, wheel assemblies 23 and 33, which are the forward-most wheel assemblies, are arranged to pivot, and in this embodiment, are somewhat longer overall than the rear wheel assemblies 24 and 34. The additional length of the forward wheel assemblies permits the apparatus to assume a comfortable reclining orientation when the apparatus is in the stroller mode.

Figure 3:
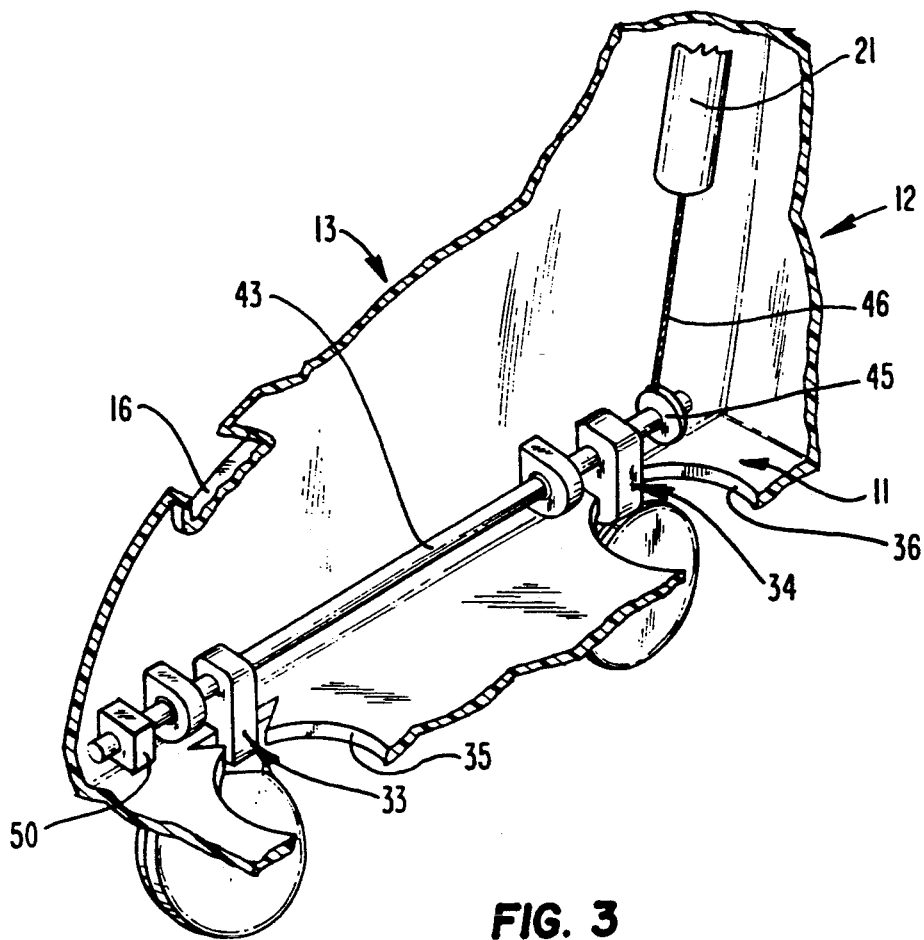
FIG. 3 is a partially fragmented and cross-sectioned isometric representation of the interior of a specific embodiment of the invention showing an illustrative system for manipulating the wheel assemblies in response to the handle.

FIG. 3 is a simplified and somewhat schematic fragmented isometric representation of the interior of apparatus 10 in the vicinity of the region where side portion 13 meets back portion 12 and seat portion 11. As shown, wheel assemblies 33 and 34 are fixed to a shaft 43 and are shown in a deployed, stroller mode. The wheel assemblies retract and deploy in response to rotation of shaft 43. In the practice of this aspect of the invention, shaft 43 is supported by structure (not shown) coupled to the interior of bottom portion 11 or side portion 13.

In this specific illustrative embodiment of the invention, shaft 43 is provided with a pulley 45 which has a cable 46 attached thereto and wound at least partially therearound. Cable 46 is connected to an inner portion of handle 21, such that when the handle is deployed by being moved upward, pulley 25 and shaft 43 are rotated clockwise so as to deploy the wheel assemblies into the stroller mode. Of course, any of several known mechanisms can be applied to effect deployment of the wheel assemblies in response to the movement of the handle can be employed in the practice of the invention.

Shaft 43 is further coupled to a biasing member which is schematically illustrated and designated with the numeral 50. The biasing member, which may be a spring, is arranged to store energy when handle 21 is urged upwards, and to release its energy by urging the wheel assemblies into the retracted, vehicle seat mode when tension of cable 46 is removed by the retraction of handle 21. Each of the handles is provided with a locking arrangement (not shown) which which may be of a known design to prevent the handles from retracting, particularly in view of the energy stored in the biasing member, until the user specifically releases same.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. An apparatus having a vehicle-seat mode and a stroller mode, the apparatus comprising:
   a shell member having a seat portion, a back portion having a forward facing surface and a rearward facing surface, and a pair of side portions, said side portions being provided with seat-belt accommodation means for maintaining a seat belt of the vehicle in a predetermined spatial relationship with respect to said shell member, said seat portion being provided with a plurality of wheel wells therethrough, said wheel wells being separated from one another by a smooth and substantially uninterrupted expanse of said seat portion and configured to be substantially rounded;

a plurality of wheel assemblies, each having a respectively associated wheel, dimensioned to be accommodated in said rounded configuration of a respectively associated one of the wheel wells, each of said wheels being rotatable in a plane of rotation and rotatably coupled to a first side of a respective carrier member, said respective carrier members each forming a respective portion of said seat portion of said shell member and further having a second side which is substantially parallel to said first side and to said plane of rotation, each carrier member being configured to have a rounded portion concentric with said respectively associated wheel and dimensioned to be accommodated in a respective one of the wheel wells;

a plurality of pivot coupling means for pivotally coupling respective ones of said wheel assemblies directly to said shell member, each where said seat portion joins respective ones of said side portions, each of said wheel assemblies being pivotable between a respective first position wherein said wheels are deployed to achieve the stroller mode, wherein said plane of rotation of said respectively associated wheel is substantially orthogonal to said seat portion of said shell member, and a second position wherein said plane of rotation of said respectively associated wheel is substantially parallel to said seat portion of said shell member, and said second side of said carrier member is substantially flush with an outer surface of a remaining portion of said seat portion of said shell member and said respectively associated wheel is contained within a respective opening in said shell member;

handle means having first and second positions, and being coupled to said back portion of said shell member for facilitating use of the apparatus in the stroller mode, said handle means being in said first position when the apparatus is in the stroller mode, and in said second position when the apparatus is in the vehicle seat mode, said handle means being disposed between said rearward and forward facing surfaces of said back portion of said seat shell;

coupling means coupling said handle means to said pivot coupling means for placing said wheel assemblies in said first position when said handle means is in said first position, and placing said wheel assemblies in said second position when said handle means is in said second position; and biasing means for applying a biasing force to said wheel assemblies, said biasing force being directed to counteract an effect of gravity tending to deploy said wheel assemblies in said stroller mode.

2. The apparatus of claim 1 wherein said plurality of wheel assemblies are arranged in first and second pairs of wheel assemblies, said wheel assemblies within each such pair being coupled to one another so as to pivot simultaneously with one another between said first and second positions.

3. A combination child vehicle seat and stroller, the combination comprising:

a seat shell having a seat portion and a back portion, said seat portion of said seat shell having a top surface and a bottom surface, and said back portion having a forward-facing surface and a rearward-facing surface, said bottom surface of said seat portion being provided with a plurality of wheel wells therethrough, said wheel wells being separated from one another by a smooth and substantially uninterrupted expanse of said seat portion of said seat shell and configured to be substantially rounded;

first and second pairs of wheel assemblies, each such pair having a forward wheel assembly and a rear wheel assembly, each wheel assembly having a wheel dimensioned to be accommodated in said rounded configuration of a respectively associated one of the wheel wells and further having a respective associated subportion of said seat portion of said seat shell associated therewith, each of said wheels being pivotally coupled concentrically to the rounded portion of said associated subportion of said seat shell, said associated subportion being pivotally coupled directly to said seat shell, said bottom surface of said seat portion of said seat shell having a plurality of bottom surface openings therein each for accommodating a respective one of said wheel assemblies in an orientation wherein a plane of rotation of each of said wheels is substantially parallel to said bottom surface of said seat portion;

wherein each subportion of each of said wheel assemblies forms a substantially flush surface with said bottom surface of said seat shell when said wheel assemblies are accommodated in said bottom surface openings;

handle means coupled to said wheel assemblies, said handle means being deployable when the combination is to be used as a stroller, said handle means being disposed between said rearward and forward facing surfaces of said back portion of said seat shell; and biasing means for applying a biasing force to said wheel assemblies, said biasing force being directed to oppose deployment of said handle means for use of the combination child vehicle seat and stroller as a stroller, and to counteract an effect of gravity tending to deploy said wheel assemblies in said stroller mode.

4. The combination child vehicle seat and stroller of claim 3 wherein there is further provided coupling means or moving said wheel assemblies pivotally in response to said handle means.

5. The combination child vehicle seat and stroller of claim 4 wherein said coupling means is arranged to urge said wheel assemblies into a stroller mode when said handle means is deployed.

* * * * *